Nov. 18, 1947.    R. E. FULTON, JR    2,430,869
ROADABLE AIRPLANE
Filed March 3, 1945    5 Sheets-Sheet 1
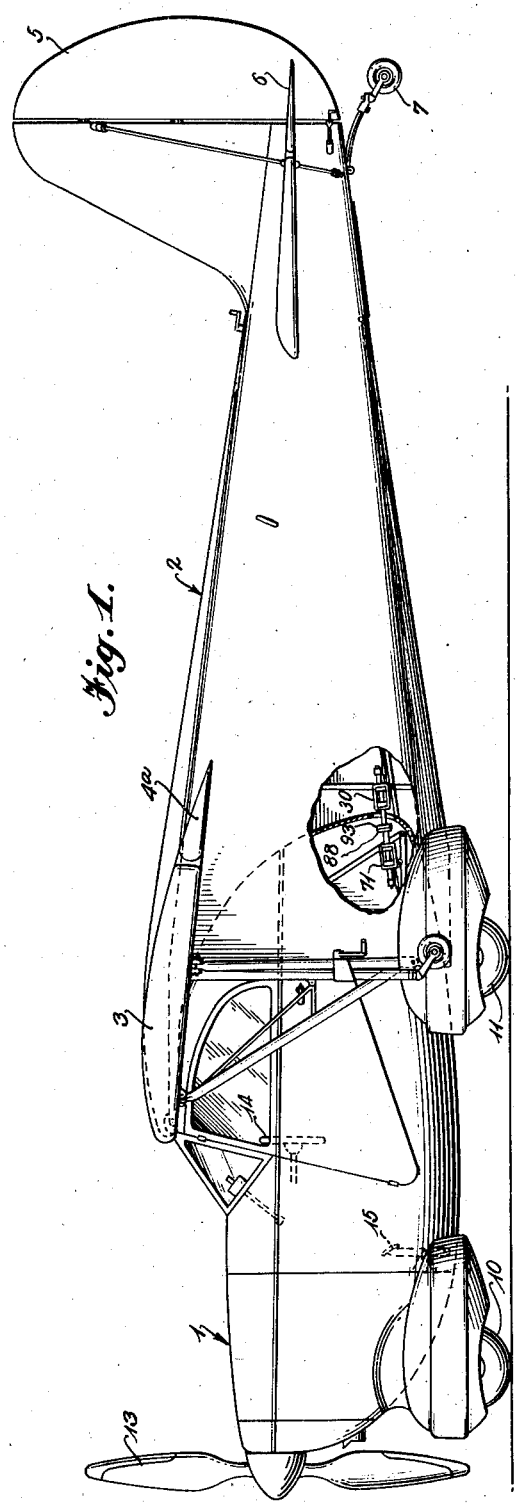
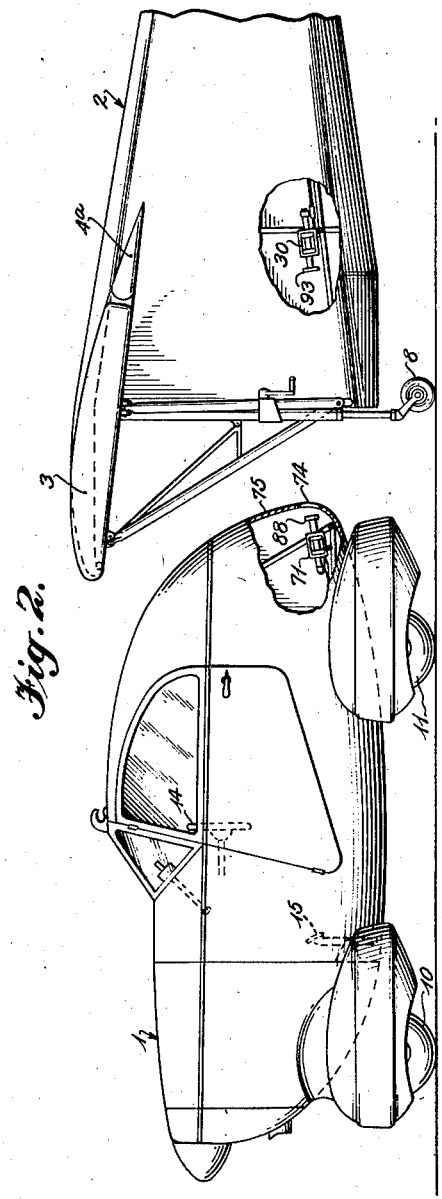
Inventor
Robert E. Fulton, Jr.
By Stevens and Davis
Attorneys

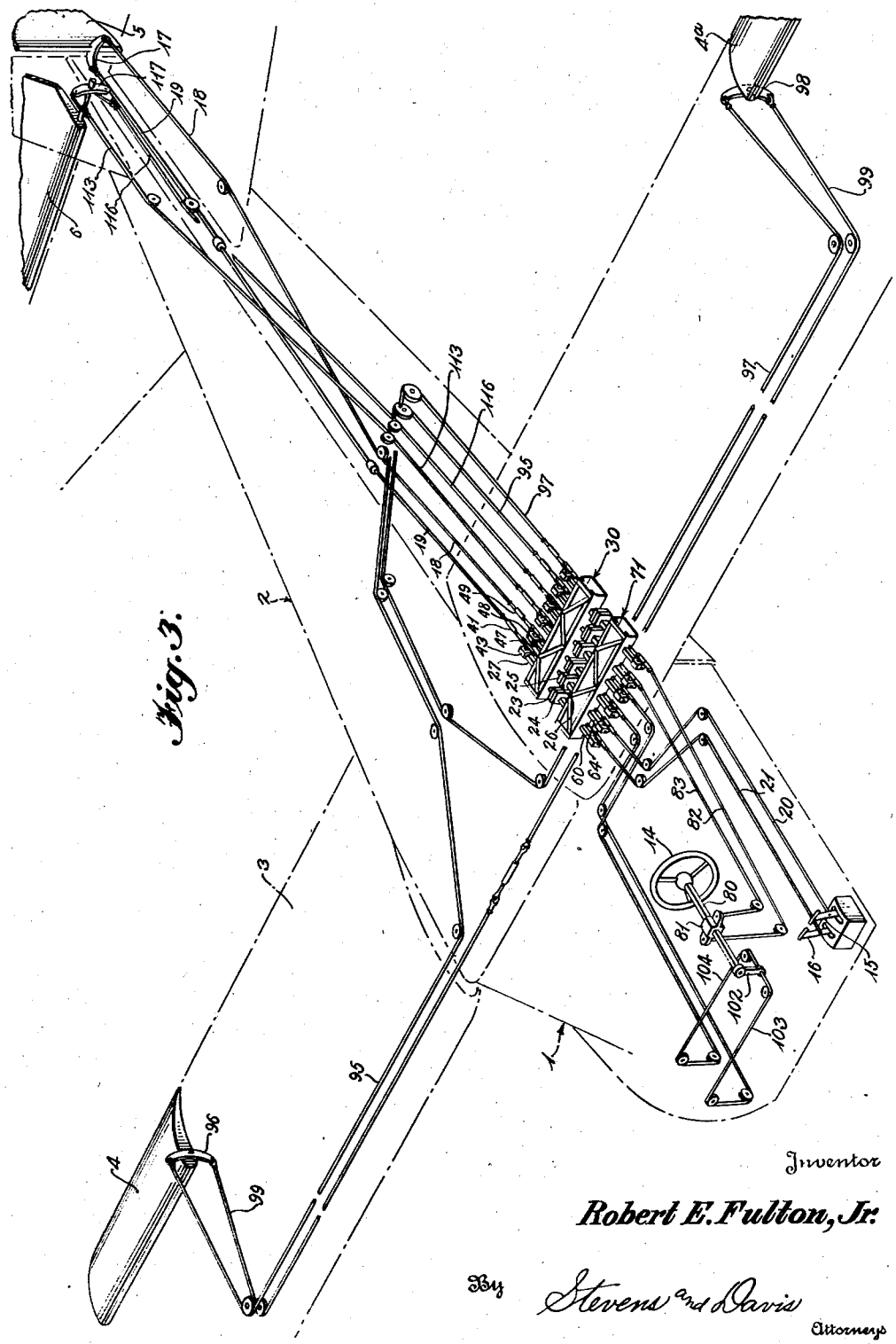

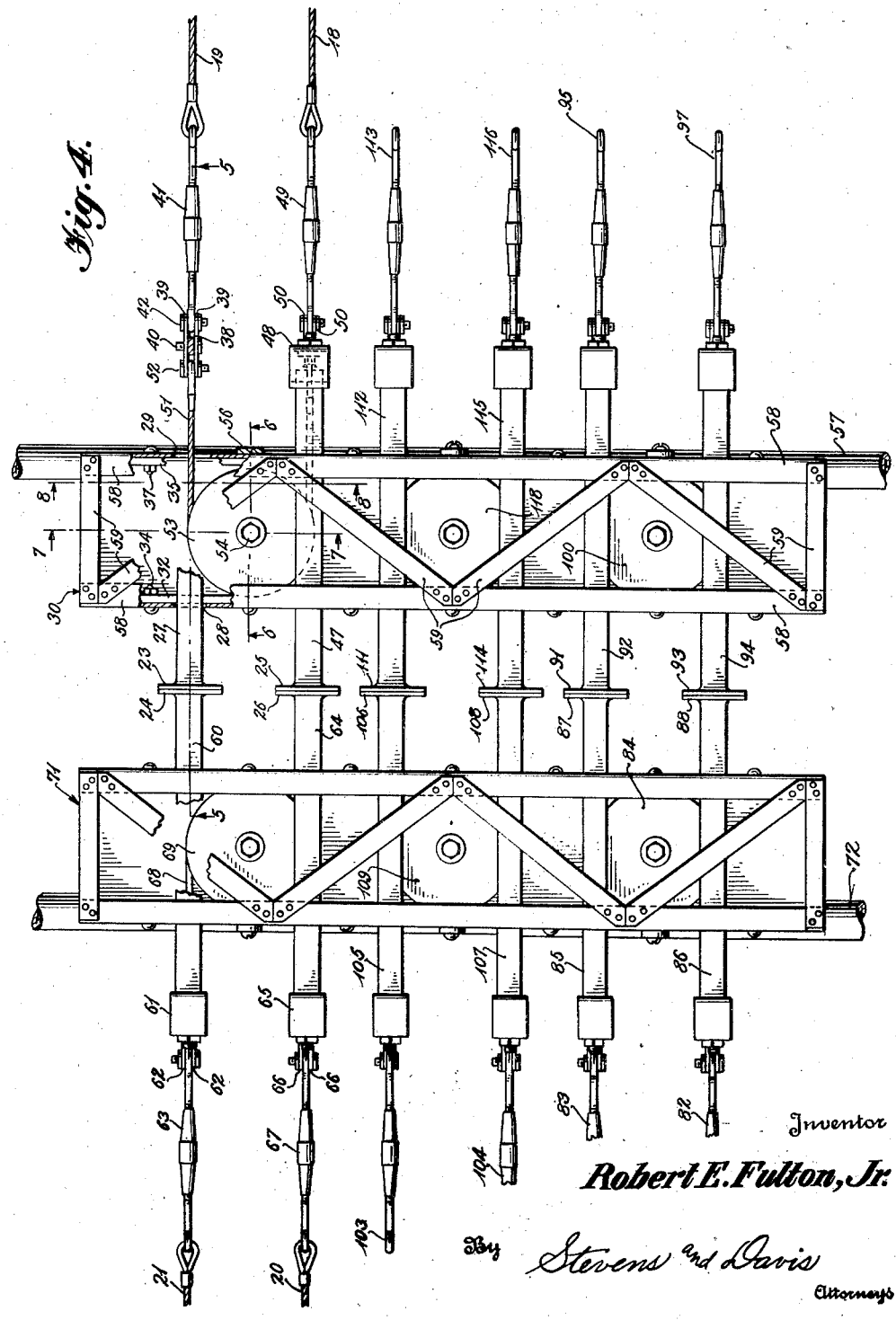

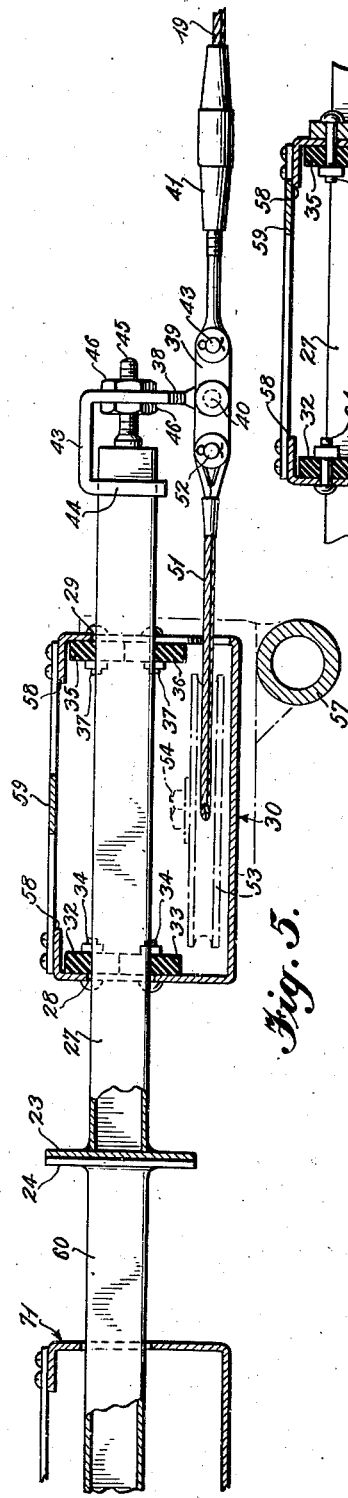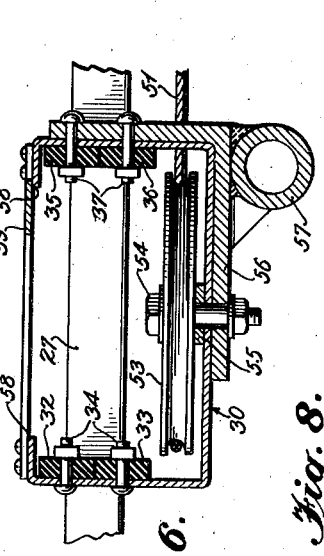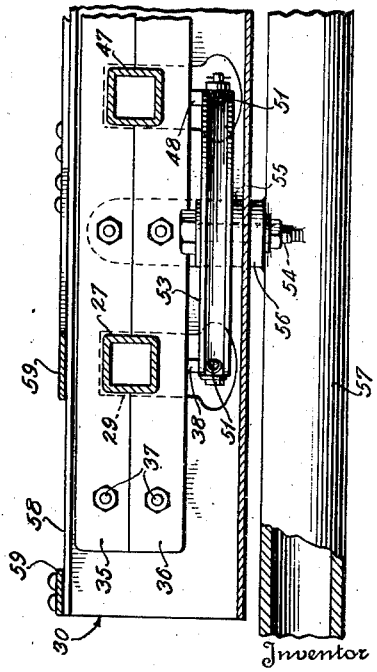

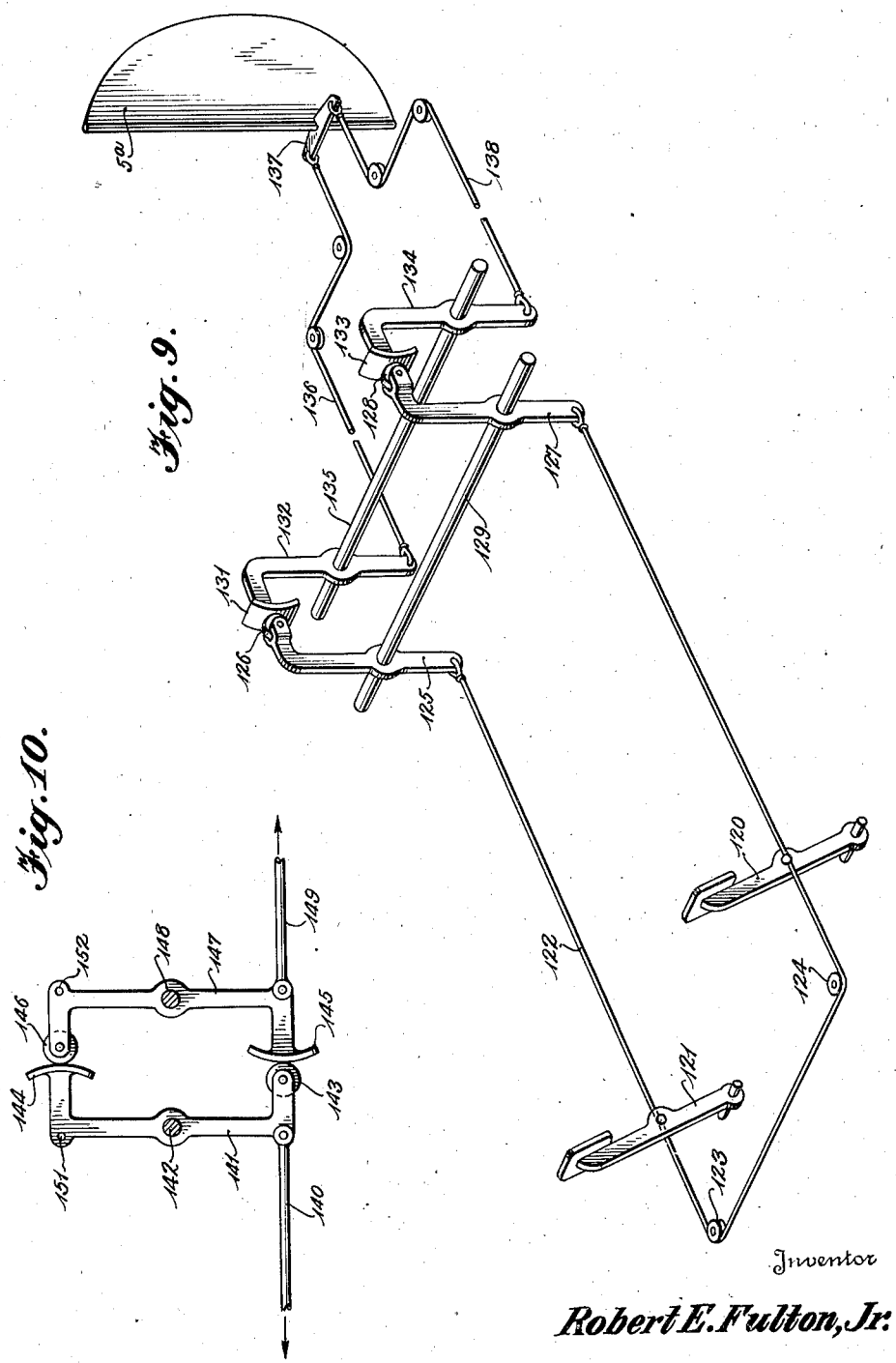

Patented Nov. 18, 1947

2,430,869

UNITED STATES PATENT OFFICE 2,430,869

ROADABLE AIRPLANE

Robert E. Fulton, Jr., Washington, D. C., assignor to Continental, Incorporated, Washington, D. C., a corporation of Connecticut Application March 3, 1945, Serial No. 580,842

2 Claims. (Cl. 244—2)

This invention relates to a vehicle primarily intended for use as an airplane in which a section containing the power unit and the operator's controls may be separately used as an automobile.

The history of the airplane is almost as old as that of the automobile. Both appeared at approximately the turn of the century. Yet today, almost a half a century later, there are a very large number of automobiles in this country to every one privately owned airplane.

Such a condition is the result of certain basic shortcomings in the airplane. Airplanes require airports to operate. Airports are of necessity located on the outskirts of communities, not infrequently at considerable distance. Thus the time saved by the speed of aerial transportation is more frequently than not consumed by the ground-travel time required to get from the airport to the flier's final destination.

Furthermore, the expense of travel between the airport and the community, usually involving taxis, is not inconsiderable. When to this is added the initial cost and upkeep of the airplane plus that of an automobile which the flier undoubtedly owns as well, it is obvious why few can afford to own an aircraft.

The average automobile ride from point of origin to destination is not over five miles. For every automobile trip of several hundred miles, the average man makes as many as a hundred short local trips. Since he can afford only an automobile or an airplane, his choice is obvious.

This has been the basic factor in retarding widespread public adoption of the airplane in the past and, unless remedied, will have a serious effect on its future. Various endeavors have been made to circumvent the situation. Closer-to-town airports, locally available cars for rent, and other expedients have been offered but they fail to solve the basic practical and economic problems.

While the real cure has been much discussed, little or nothing of a practical nature has been executed to carry it into effect. Obviously there is much in common between an automobile and an airplane. Both have wheels, a body, a cab or cabin, a motor, and controls for starting, guiding and stopping. When a pilot leaves his aircraft at an airport and takes a cab to town he is leaving behind 90% of the basic elements of an automobile—an expensive and unnecessary procedure which has done more than any other thing to stifle aviation.

Others have recognized this fundamental problem and have made efforts to solve it by accomplishing a transition from airplane to car and back. But the problem has many aspects—mechanical, aerodynamic, practical, safety, economy, comfort, service and maintenance, public reaction and acceptance. Of the several suggested solutions which have been offered to date, all have failed due to neglect of one or more of the above features. Most have been so radical in conception and based on such untried principles that they have failed to hold public interest. Others have made contributions which, unless supplemented by many additional features, were of little practical value.

It is an object of this invention to produce a roadable airplane by making a practical combination of already accepted forms and styles of automobile and aircraft designs, thereby making the final unit one of greater public value by virtue of its ready acceptance resulting from its being basically a combination of already familiar elements.

The present invention therefore is concerned with an airplane having a removable section which may be used as an automobile for road travel, and an airplane section comprised of wings, fuselage, and control surfaces. Cooperating interlocking means are provided on the airplane and automobile sections by which the sections may be firmly held together to establish a complete airplane for air travel. When these interlocking means are disengaged the automobile section may be driven upon a road, the airplane section being left behind.

The airplane section includes a number of movable flight control surfaces which are moved by force transmitting connections leading from them to a position adjacent to the pilot where he can operate these connections. As the pilot is in a cabin of the automobile section it is apparent that these connections must be broken when the automobile section is removed from the airplane section and must be re-established when the sections are re-united. The present invention provides a means for rapidly breaking and re-establishing these connections.

The control surfaces which should be upon the airplane section include a rudder for determining the forward lateral direction of flight, elevators for determining the vertical direction of flight, and ailerons for determining the level lateral position of the airplane or its banking movement. These control surfaces are customarily operated by manually movable means accessible to the pilot and intermediate force transmitting connections as, for example, cables. Thus the rudder is moved by two foot pedals, the elevators are moved by a back and forth movement of a steering wheel, and the ailerons are moved by rotation of the steering wheel.

It is intended that this steering wheel should be the same one which is utilized to guide the front wheels of the automobile section and that the foot pedals should be the same ones provided to control automobile movement as to apply the clutch and brake when the automobile section is being driven upon a road. However, the invention is not limited in this respect as the steering wheel and foot pedals may be ones especially provided to move the flight control surfaces. It is intended, however, that this steering wheel and pedals should be in the cab of the automobile section and that this cab should constitute the pilot's cabin of the completed airplane. Moreover, the invention is not limited to manipulation of the ailerons, rudder and elevators as it may be applied as well to other movable members as flaps, slots, spoilers, stabilizers and trim-tabs. The mechanism of the invention may also be used to transmit forces between the automobile and airplane sections to move other elements as to retract and lower wheels, and to operate lights.

It has been stated that since the airplane flight control surfaces are upon the airplane section, and the manually operable elements for moving them are in the removable automobile section, some means must be provided to break the force transmitting connections between the control surfaces and the manually operable elements when these sections are separated from each other. The present invention provides means by which these connections are rapidly broken when the sections are separated from each other, or are re-established when the sections are interlocked to each other.

As an important feature of the invention, this means for establishing the force transmitting connections between the automobile and airplane sections is such that the connections are established merely upon the act of bringing the sections together so that no actual manual attachment within the connections themselves is necessary.

With the force transmitting means of the invention, the interconnecting of the automobile and airplane sections causes an automatic alignment of the separate elements of this means so that it is assured that the force applied in the airplane section will be properly transmitted to the automobile section.

Inasmuch as the force transmitting connections between the airplane section and the automobile section are established by the mere act of bringing the sections together, an important safety benefit is obtained since it is certain that when the sections are rigidly interlocked the force transmitting connections from the manually operable means to the airplane control surfaces will be established.

Moreover, the invention lends itself to any degree of duplication so that additional manually movable elements within the automobile section will operate elements in the airplane section when the sections are brought together, and all of the force transmitting connections between the sections will be established irrespective of their number when the automobile and airplane sections are interlocked.

Other features of the invention will be evident from the following description and from the drawings which disclose a preferred structural embodiment of the invention.

In the drawings:

Figure 1 is a side elevation of the airplane as it appears when the automobile and airplane sections are assembled for flight, the covering material being broken away to show certain structural elements of the invention;

Fig. 2 shows the automobile section removed from the airplane section and the airplane section in its self-sustaining position;

Figure 3 is a perspective of the airplane, the covering material and supporting structure being removed to show the cable interconnections;

Figure 4 is a plan of the separable force transmitting mechanism of the invention;

Figure 5 is a section on the line 5—5 of Figure 4, on an enlarged scale;

Figure 6 is a section on the line 6—6 of Figure 4, on an enlarged scale;

Figure 7 is a section on the line 7—7 of Figure 4, on an enlarged scale;

Figure 8 is a section on the line 8—8 of Figure 4, on an enlarged scale;

Figure 9 is a schematic representation of a modified form of separable force transmitting mechanism; and Figure 10 illustrates a further modification of the invention.

Referring first to Figure 1, the automobile section 1 of the airplane appears at the left of the vehicle, and the airplane section 2 appears at the right of the vehicle. In Figure 1, these two sections are combined for flight, and in Figure 2 they are separated from each other so that the automobile section may be driven independently as a unit for road travel. When the automobile section is used as a unit the airplane section 2 is left behind.

The airplane section 2 includes lifting wings 3 at its forward portion and at the trailing edges of these wings are the usual ailerons 4 and 4a. At the rear of the airplane section are the usual control surfaces, and these include the rudder 5 and the elevators 6. Beneath these tail surfaces is a tail wheel 7.

When the airplane section is attached to the automobile section, as shown in Figure 1, the airplane section is supported as a cantilever as shown in Figure 1. The means for attaching these sections together and by which the sections may be released from each other constitute no part of the present invention, and consequently are not shown in detail. A suitable interconnecting means is disclosed in application Serial No. 580,844, filed herewith. When this interconnecting means is released and the sections are separated from each other, the airplane section must be self-supporting, and to accomplish this it is provided with wheels 8 beneath the forward wings.

Just prior to the time that the airplane section is separated from the automobile section, the wheels 8 and the tail wheel 7 are moved downwardly into contact with the ground. The means by which the wheels 7 and 8 are moved downwardly are not a part of the present invention, and therefore are not here described in detail, but suitable means is disclosed in application Serial No. 580,843, filed herewith. These wheels 7 and 8 support the airplane section in the same position which it would occupy if it were attached to the automobile section so that separation of the sections and their reconnection is facilitated.

The automobile section 1 includes the front wheels 10 and the rear wheels 11. It also includes a motor to which the propeller 13 may be attached for air travel, as shown in Figure 1, or from which it may be removed for road travel, as shown in Figure 2. A steering wheel 14 within the cab portion of the automobile section is provided so that the front wheels 10 may be turned to guide the automobile during road travel, or so that the ailerons 4 and 4a of the airplane section may be moved during air travel. This steering wheel 14 is movable back and forth in an axial direction, and this movement is intended to move the elevators 6 to control flight of the airplane. The details of construction of a suitable steering mechanism and the means by which the operation of the steering wheel may be changed, if such a change is desired, from control for road travel or to control for air travel is disclosed in application Serial No. 580,845, filed herewith.

Within the cab and accessible to the operator are foot pedals 15 and 16. During air travel these pedals are operated to move the rudder 5 at the rear end of the airplane section, and during road travel one or more of them may be utilized to control the automobile section movement, as to operate the clutch and brake. The details of construction of a suitable pedal mechanism and the means by which this action of the foot pedals may be modified for road travel or for air travel if this is desired, is disclosed in application Serial No. 580,846, filed herewith.

As has been pointed out, since the steering wheel 14 and the pedals 15 and 16 are in the automobile section, and the control surfaces 4, 5 and 6 to be moved thereby are in the airplane section, and inasmuch as the force transmitting connections between these manually operable elements and the control surfaces must be broken when the sections are separated, it is important that means be provided for permitting such a break in the connections. As here shown, this break occurs at the meeting zone between the sections.

Considering first the force transmitting connections between the rudder 5 at the tail end of the airplane section and the foot pedals 15 and 16, the rudder 5 is directly moved by cables 18 and 19 connected to the opposite arms of a double bracket 17 extending on opposite sides of the rudder 5. In an airplane that did not have separable airplane and automobile sections the cables 18 and 19 ordinarily would be directly connected to the pedals 15 and 16 respectively. Thus the cables 20 and 21 which are connected to the pedals 15 and 16 might, in fact, be forward integral parts of cables 18 and 19 respectively. However, in accordance with the invention there is no direct interconnection between cables 18 and 20 on the one hand, and 19 and 21 on the other hand, but movement of cables 20 and 21 under the action of foot pedals 15 and 16 is caused to correspondingly operate cables 18 and 19 by the pressure or force transmitting means of the invention.

This force transmitting means includes a pressure plate 23 which, as will be explained in detail, is connected to cable 19, a pressure plate 24 which is connected to cable 21, a pressure plate 25 which is connected to cable 18, and a pressure plate 26 which is connected to cable 20. As appears from Figures 1 and 2, pressure plates 24 and 26 are carried at the rear portion of the automobile section and pressure plates 23 and 25 are carried at the forward portion of the airplane section. When the automobile and airplane sections are interlocked together, the plates 23 and 24 are in face-to-face contact with each other and serve to transmit forces directly from cable 21 to the cable 19. In like manner plates 25 and 26 are in face-to-face contact with each other when the airplane and automobile sections are interlocked together and serve to transmit forces directly between cables 20 and 18.

As the plates 23 and 25 may separate from plates 24 and 26, respectively, without in any way impairing the attachment of each of these plates to its particular cable, the separation of the automobile and airplane sections may be accomplished without attention being given to these force transmitting elements. After separation of the sections the plates 23, 24, 25 and 26 remain attached to their cables as prior to separation of the sections.

The means by which the plates 23 and 25 are attached to and operated by the cables 19 and 18 is best shown in Figures 4 and 5. Plate 23 is connected to the end of a square push shaft 27 so that it is perpendicular to the axis of this shaft. For lightness, this shaft is made hollow. Shaft 27 is guided in its back and forth movement by passing through aligned openings 28 and 29 on opposite sides of a box-like support 30.

The openings 28 and 29 are larger than the square shaft 27 and a bearing support for the shaft 27 is provided by means of strips 32 and 33 which are affixed by bolts 34 to the wall having therein the openings 28. Similar strips 35 and 36 are attached by bolts 37 to the wall of support 30 having the opening 29 therein. The strips 32, 33, 35 and 36 have square notches to receive the push shaft 27, and when the strips of each pair are brought together around shaft 27, as best shown in Figure 7, they constitute a bearing support on all four sides of the shaft 27.

The push shaft 27 therefore bears upon these broad bearing strips 32, 33, 35 and 36 in its endwise movement, and not upon the thin wall section of the support 30. As the shaft 27 is square and the openings in the bearing strips constitute a square, the shaft 27 cannot rotate but can only move endwise. These bearing strips are preferably made of a low friction material as "Bakelite."

At the end of the push shaft 27 opposite from the plate 23 is a depending arm 38. Connecting links 39 are on opposite sides of the lower end of the depending arm 38 and are pivoted to it by a pin 40. One end of a turnbuckle 41 is between the links 39 and pivoted to them by a pin 42, and this turnbuckle 41 at its other end is connected to the cable 19. A pull upon the cable 19 will therefore draw the presser plate 23 toward the box-like support 30.

The depending cable-attaching arm 38 is adjustable endwise relative to the square shaft 27. To accomplish this the arm 38 is made a part of a bracket 43 of inverted U-shape. The arm 44 of bracket 43 has a square opening therein to receive the square shaft 27 and prevent rotation of bracket 43. A bolt 45 affixed to the end of shaft 27 passes through an opening in arm 38 and nuts 46 are threaded on the bolt 45 on opposite sides of arm 38. By adjusting nuts 46 the arm 38 will be shifted endwise of the square shaft 27.

The cable 18 is connected to the presser plate 25 by a construction similar to that which has been described. This includes a square push shaft 47 at the rearward end of which is attached a bracket 48 similar to bracket 43. Cable 18 is connected to the bracket 48 through a turnbuckle 49 and links 50.

In order to maintain the cables 18 and 19 taut so that movement of one will cause movement of the other, an interconnecting link is located between the cables 18 and 19. In accordance with the present invention this includes a cable 51 one end of which is attached by pin 52 to the ends of the connecting links 39 opposite from turnbuckles 41. The other end of cable 51 is attached by a pin to the connecting links 50. Between its ends the cable 51 passes over a pulley 53 which is rotatably mounted upon a bolt 54 supported in the bottom wall of the box-like support 30. A washer 55 upon the bolt 54 spaces the pulley 53 away from this bottom wall of the support 30. As appears from Figure 8, opening 29 for shaft 27 extends low enough to permit the passage of one end of cable 51 and the opening for shaft 47 also accommodates the other end of cable 51.

The bolt 54 also passes through a bracket 56 which is located along the box-like support 30 at this point. This bracket 56 affords an additional support for bolt 54 and also serves as a means of attaching the support 30 to a frame bar 57 of the fixed framework. Bolts 37 pass through bracket 56, as is shown in Figure 6.

As appears from Figures 5 and 6, the box-like support 30 is made from sheet metal material formed into a channel shape. The bolt 54 passes through the bottom wall of this channel and the openings 28 and 29 are in the opposite walls of the channel. The upper ends 58 of this material are turned inwardly to provide an attachment portion for the cross-ties 59. This channel-shaped support 30 is long enough to accommodate a large number of push shafts as appears from Figure 4. A plurality of brackets similar to bracket 56 are spaced along the support 30 to attach it to frame bar 57.

From Figure 4 it is apparent that the cable 19, links 39, cable 51, links 50, and the cable 18 constitute a direct looped connection to the opposite arms of the lever 17 of the rudder 5. The turnbuckles 41 and 49 may be drawn tight so that the cables 18, 19 and 51 are taut at all times and movement of the one will cause movement of the others and also movement of rudder 5. The square push shaft 27, by means of its bracket 43, is connected to a forward extension of cable 19 to provide a force transmitting take-off from cable 19. A similar relationship is true of pusher plate 25 and push shaft 47 as they constitute the force take-off means with respect to the cable 18.

If the pressure plate 23 is pushed upon by plate 24 toward support 30, cable 51 will thereby be drawn around the pulley 53 by links 39 in such a manner as to pull upon the connecting links 50, the turnbuckle 49 and the cable 18 to thereby move the rudder. Such movement of the connecting links 50 carries with it the push shaft 47 and pressure plate 25 so that the pressure plate 25 moves forwardly against plate 26 in an opposite direction from the direction in which pressure plate 23 is moving. The movement of rudder 5 under the pull of cable 18 will cause a pull upon cable 19 so that cable 19 will follow along with the movement of links 39.

A movement of pressure plate 25 in an opposite direction, that is, towards the support 30, will cause a pull upon the cable 19 through the action of the connecting cable 51 to thereby move the rudder 5 in the opposite direction. Simultaneously therewith the pressure plate 23 will be moved in an opposite direction from that in which the pressure plate 25 moves. The rudder 5 will pull upon the cable 18 so that it will follow the motion of links 50.

Pressure plate 24 is connected to cable 21 by means similar to that by which cable 19 is connected to plate 23, except for a reversal of their positions. This connection includes a push shaft 60, adjusting bracket 61, connecting links 62 and a turnbuckle 63. Pressure plate 26 is in like manner connected to cable 20 through a push shaft 64, adjusting bracket 65, connecting plate 66, and a turnbuckle 67. A cable 68 (Figure 4) is connected to the links 62 and 66 and passes around a pulley 69. Cable 68 therefore serves to tie together the cables 20 and 21 and causes movement of one of the plates 24 or 26 to move in the opposite direction from the movement which is imparted to the other one of these pressure plates 24 and 26.

The push shafts 60 and 64 and the pulley 69 are mounted in a box-like support 71 which is similar in construction to support 30. This support 71 is attached to a bar 72 of the automobile fixed framework. As appears from Figures 1 and 2, the supports 30 and 71 are so located in the automobile section 1 and airplane section 2 that when the sections are interconnected the pressure plates in the airplane section will just contact the cooperating pressure plates in the automobile section. In neutral position, the automobile pressure plates lie just inside an opening 74 (Figure 2) in the rear wall 75 of the automobile body. If desired a thin flexible sheet, as of rubber, may be affixed to wall 75 over opening 74 to prevent entry of dirt and this sheet should be flexible enough so that it may remain in place at all times without resisting movement of the pressure plates. The turnbuckles 42, 49, 63 and 67 and the adjustable brackets 43, 48, 61 and 65 permit the movement of the rudder 5, foot pedals 15 and 16, and the pressure plates 23, 24, 25 and 26 to a neutral position with the pressure plates in light contact with each other.

When the airplane and automobile sections are assembled, therefore, a pressure, for example, upon the pedal 16 will exert a pull on the cable 21 and will draw the pressure plate 24 towards the support 71. This will cause a movement of pressure plate 26 away from the support 71 due to the interconnection established by cable 68. Pressure plate 26 will therefore bear upon the pressure plate 25 to exert a pull upon cable 51 which, in turn, will exert a pull upon the cable 19. This pull upon the cable 19 will carry with it the push shaft 27 so that the pressure plate 23 attached thereto will follow along with the pressure plate 24 as though there were, in fact, a connection between the pressure plates 23 and 24 by which plate 23 is drawn along with plate 24. Downward pressure upon the pedal 16 will therefore pull upon the cable 19 to turn the rudder 5 in the desired direction in the same manner that this would be performed if cables 19 and 21 were one cable.

Pressure upon the pedal 15 causes movement of rudder 5 in the opposite direction in a manner similar to that which has been described. Also, the forces exerted in either direction upon the rudder 5 by air pressure will be transmitted forwardly to the foot pedals, through the force transmitting means which have been described. Because of this the pilot can feel the effect of pressure on the rudder 5 in the same manner that he would if cables 18 and 19 were connected directly to the pedals 15 and 16.

The forces resulting from rotational movement of the steering wheel 14 are applied to move the ailerons 4 through force transmitting means which are identical with the force transmitting means which have been described with reference to the foot pedals and the rudder. In the schematic representation of Figure 3, the steering wheel 14 is shown attached to a square shaft 80 which passes through a square opening in a block 81. To opposite sides of the block 81 are attached cables 82 and 83, respectively. Rotation of the wheel 14 therefore pulls upon one of the cables 82 and 83. The shaft 80 can be moved back and forth through the block 81 in the usual manner.

Cables 82 and 83 have turnbuckles therein and are joined by a cable similar to cable 68 and which passes around a pulley 84 (Figure 4) rotatably mounted in the support 71. A push shaft 85 is connected to cable 83 and a push shaft 86 is connected to cable 82 through adjustable brackets similar to brackets 61 and 65. A pressure plate 87 is carried at the end of push shaft 85 and a pressure plate 88 is carried at the end of push shaft 86. The push shafts 85 and 86 are mounted for endwise movement in the support 71 in the same manner that push shafts 60 and 64 are mounted.

Pressure plate 87 bears against a pressure plate 91 which is attached to a push shaft 92. Pressure plate 88 bears against a pressure plate 93 which is attached to the end of a push shaft 94. These push shafts 92 and 94 are mounted for endwise movement in the support 30 similar to the mounting of push shafts 27 and 47.

A cable 95 is connected to the push shaft 92 and also to the upper arm of a lever 96 (Figure 3) secured to aileron 4. A cable 97 is attached to push shaft 94 and also to the upper arm of a lever 98 connected to the aileron 4a. A cable 99 is connected to the lower ends of the levers 96 and 98 and this cable will tie the ailerons 4 and 4a together so that they will move in opposite directions. There are turnbuckles in cables 95 and 97 corresponding to turnbuckles 41 and 49.

The ends of cables 95 and 97 to which are attached the push shafts 92 and 94 are joined together by an interconnecting cable which passes over pulley 100 rotatably mounted in the support 30. This interconnecting cable is attached to the cables 95 and 97 in the same manner that interconnecting cable 51 is attached to cables 18 and 19. Also, push shafts 92 and 94 are attached to cables 95 and 97 through adjusting brackets similar to adjusting brackets 43 and 48.

Rotation of the wheel 14 in such a direction as to pull on the cable 82 will therefore cause a movement of the pressure plate 87 away from the support 71 to push upon the pressure plate 91. Such movement of the pressure plate 91 toward its support 30 will cause a pull upon the cable 97 and this will move the aileron 4a. The other arm of lever 98 of aileron 4a will pull upon the cable 99 to turn the lever 96 and thereby move the aileron 4.

Rotational movement of the wheel 14 in the opposite direction, that is to exert a pull upon the cable 83, will cause movement of the ailerons 4 and 4a in the opposite directions. The forces exerted upon the ailerons 4 and 4a by air pressure will be transmitted back to the wheel 14 through the force transmitting connections which have been described and the pilot can consequently feel the changes in air pressure on the ailerons. Therefore, the cables 95 and 97 function as though they were directly connected to the opposite arms of the block 81.

Back and forth movement of the wheel 14 carries with it an arm 102 (Figure 3) within which the shaft 80 may rotate. A cable 103 is connected to one side of arm 102 and a cable 104 is connected to the other side of arm 102. Cable 103 is attached to a push shaft 105 (Figure 4) to the end of which is secured a pressure plate 106. Cable 104 is attached to a push shaft 107 to which is secured a pressure plate 108. An interconnecting cable between cables 103 and 104 passes around a pulley 109. Push shafts 105 and 107 and pulley 109 are mounted in support 71 in the same manner that the other corresponding elements are mounted.

Pressure plate 106 bears against a pressure plate 111 which is carried by a push shaft 112 and to this push shaft is attached a cable 113. Pressure plate 108 bears against a pressure plate 114 which is carried by a push shaft 115 and to this push shaft is attached a cable 116.

Cables 113 and 116 are attached to the opposite arms of a lever 117 which is connected to the elevators 6 to move them. Cables 113 and 116 are interconnected by a cable which passes around a pulley 118 rotatably mounted in support 30.

If the wheel 40 is urged away from the pilot a pull will be exerted upon the cable 104 and this will cause the pressure plate 106 to bear and push the pressure plate 111. This movement will exert a pull upon the cable 116 to thereby move the elevators 6 so as to cause a descent of the airplane. If the wheel 14 is withdrawn by the pilot the rudder will be moved in an opposite direction due to a direct pull upon cable 103 and a pull upon cable 113 due to pressure of plate 108 against plate 114.

When the automobile and airplane sections are interlocked therefore the force transmitting means of the invention will automatically establish an operating connection between the flight control surfaces on the airplane section 2 and the manually operable means on the automobile section 1. When it is desired to remove the automobile section for road travel, the force transmitting means of the invention does not interfere in any way with the separation of the sections and requires no manual manipulation or attention as the cooperating, opposing plates, merely withdraw from each other.

In the arrangement which has been described, the separation within the force transmitting means occurs upon a longitudinal separation between the airplane and automobile sections. The invention is not limited in this respect as it is apparent that the force transmitting means may be disposed in any direction. Thus in other situations it may be disposed vertically so that upon a vertical separation between the sections carrying the two parts of the force transmitting means the separation will likewise occur within this means. Likewise, the force transmitting means may be disposed so that upon lateral removal of a section carrying one part of the means, the necessary separation within the force transmitting means will occur.

The invention has been described here with particular reference to an airplane having a section which can be removed and used as an automobile for road travel. However, the invention is not limited to this use as it may as well be used with an amphibious airplane having a section which may be removed and used as a boat. Other similar applications of the invention will be apparent.

In the modification of Figure 9, the foot pedals 120 and 121 are directly attached to opposite spans of a looped cable 122. The cable is looped around pulleys 123 and 124 which are spaced from the pedals sufficiently far to not interfere with the pedal movement. Also, the pulleys 123 and 124 are spaced far enough apart to deliver the cable spans in parallel relation to the pedals 120 and 121.

One end of cable 122 is attached to the lower end of a lever 125. The upper end of lever 125 is forked and a roller 126 is rotatably mounted between the forked ends. This forked end constitutes a laterally projecting portion of lever 125 to carry the roller 126 to the rear of the central portion of the lever.

The other end of cable 122 is attached to the lower end of a lever 127. This lever 127 is a duplicate of lever 125 and at its upper end is rotatably mounted a roller 128. Levers 125 and 127 are pivotably mounted upon a pivot rod 129.

Roller 126 is in contact with a roller pad 131 carried by a lever 132, and roller 128 is in contact with a roller pad 133 carried by a lever 134. Lever 132 and lever 134 are pivoted upon a pivot rod 135 which is parallel to pivot rod 129. Pressure of roller 126 against pad 131 therefore causes lever 132 to pivot, and pressure of roller 128 against pad 133 causes lever 134 to pivot.

The lower end of lever 132 is connected by a cable 136 to one side of a lever 137 attached to rudder 5a. The lower end of lever 134 is connected by a cable 138 to the other side of the lever 137. The cables 136, 138 and 122 are drawn sufficiently tight to maintain rollers 126 and 128 in contact with pads 131 and 133 and turnbuckles preferably should be located in these cables to bring the elements to a simultaneous neutral position.

Pressure for example upon foot pedal 120, pulls upon lever 127 and applied roller 128 against pad 133. The consequent pivoting movement of lever 134 pulls upon cable 138 and causes rudder 5a to turn. This turning of rudder 5a pulls upon cable 136 and pivots lever 132 to apply pad 131 against roller 126. The resultant pivoting of lever 125 causes a pull upon cable 122 to maintain it taut. Foot pedal 121 consequently moves in a direction which is opposite to that in which pedal 120 was urged.

If foot pedal 121 is pressed upon the reverse movement occurs. It will therefore be seen that the cables of the system remain taut constantly and cables 136 and 138 move as though they were integral end extensions of cable 122.

The pivot rods 129 and 135 are intended to be carried by separable sections as the automobile and airplane sections of Figures 1 and 2. Separation of these sections results in withdrawal of rollers 126 and 128 from pads 131 and 133 so that the separation may be accomplished without any attention being given to this force transmitting system.

In the arrangement of Figure 10 a push-pull rod 140 is attached to one end of a lever 141 pivotally mounted upon a rod 142. At one end of lever 141 is a rotatably mounted roller 143 and at its other end is a pad 144.

In contact with roller 143 is a pad 145, and in contact with pad 144 is a roller 146. Pad 145 and roller 146 are carried by a lever 147 pivoted upon a rod 148. To the lower end of lever 147 is attached a push-pull rod 149.

In use, the push-pull rod 104 may be attached to pin 41 of Figure 6 of application Serial No. 580,847, filed herewith, so that rod 140 will be moved back and forth by the pedal movement. The push-pull rod 149 may be connected to one arm of the lever 137 of Figure 9 to turn the rudder in both directions.

A push or a pull upon rod 140 will therefore exert a corresponding push or a pull upon rod 149 and these two rods will therefore move in unison as though they were integral. As pivots 142 and 148 are intended to be attached to separable sections, it is apparent that this force transmitting means will not interfere with the separation of the sections.

Instead of the push-pull rod 140, a cable as 122 in Figure 9 may be used and its two ends will be attached to lever 141 and 151, and at the point of attachment of rod 140. In like manner, cables as 136 and 138 may replace the push-pull rod 149 and they may be attached to lever 147 at 152 and at the point of attachment of rod 149.

What is claimed is:

1. An airplane including an earth-bound section having therein a manually movable device, an airplane section separable therefrom and having an element to be moved upon movement of said device, and a connection between said device and said element to transmit operating forces therebetween, said connection including a pair of cables attached to said device to be alternatively moved thereby upon reversed manual operation of said device, an interconnection between the other ends of the cables to maintain them taut, a pair of members mounted for reciprocating movement in the earth-bound section at its meeting zone with the airplane section, said members have an attachment to the respective cables so that the one moves in the opposite direction from the other, another pair of pressure members mounted for reciprocating movement in the airplane section in position to cooperate with the first pair of members when the sections are interlocked together, another pair of cables connected at one of their ends to said element to move alternatively upon reversed movement of said element, and an interconnection between the other ends of said cables to maintain them taut, said other pair of members having an attachment to the respective cables so that the one moves in the opposite direction from the other, the first pair of members being withdrawable from said other pair of members upon separation of said sections and said cooperating members serving to transmit forces therebetween to cause simultaneous movement of said device and said element.

2. An airplane including an earth-bound section having therein a manually movable device, an airplane section separable therefrom and having an element to be moved upon movement of said device, and a connection between said device and said element to transmit operating forces therebetween, said connection including a pair of cables attached to said device to be alternatively moved thereby upon reversed manual operation of said device, a cable looped between the other ends of said pair of cables in a direction away from said device, to maintain them taut, a pair of members mounted for reciprocating movement in the earth-bound section at its meeting zone with the airplane section, said members having an attachment to the respective cables so that the one moves in the opposite direction from the other, another pair of pressure members mounted for reciprocating movement in the airplane section in position to cooperate with the first pair of members when the sections are interlocked together, another pair of cables connected at one of their ends to said element to move alternatively upon reversed movement of said element, and a cable looped between the other ends of said other pair of cables in a direction away from said element to maintain them taut, said other pair of members having an attachment to the respective cables so that the one moves in the opposite direction from the other, the first pair of members being withdrawable from said other pair of members upon separation of said sections and said cooperating members serving to transmit forces therebetween to cause simultaneous movement of said device and said element.

ROBERT E. FULTON, Jr.

REFERENCES CITED

The following references are of record in the file of this patent:

UNITED STATES PATENTS

| Number | Name | Date |
|---|---|---|
| 2,373,467 | Frakes | Apr. 10, 1945 |
| 1,708,373 | Weymouth | Apr. 9, 1929 |
| 1,720,421 | Loudy | July 9, 1929 |
| 2,215,003 | Johnson | Sept. 17, 1940 |